(12) United States Patent
Frank et al.

(10) Patent No.: US 11,092,031 B2
(45) Date of Patent: Aug. 17, 2021

(54) DRIVE SYSTEM FOR AN AIRCRAFT

(71) Applicant: Siemens Aktiengesellschaft, Munich (DE)

(72) Inventors: Michael Frank, Uttenreuth (DE); Jörn Grundmann, Großenseebach (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 377 days.

(21) Appl. No.: 16/097,893

(22) PCT Filed: Apr. 18, 2017

(86) PCT No.: PCT/EP2017/059134
§ 371 (c)(1),
(2) Date: Oct. 31, 2018

(87) PCT Pub. No.: WO2017/190940
PCT Pub. Date: Sep. 11, 2017

(65) Prior Publication Data
US 2019/0145273 A1    May 16, 2019

(30) Foreign Application Priority Data
May 2, 2016   (DE) ............... 10 2016 207 517.9

(51) Int. Cl.
*F01D 15/10*   (2006.01)
*F01D 13/02*   (2006.01)
(Continued)

(52) U.S. Cl.
CPC ........... *F01D 15/10* (2013.01); *B64D 27/24* (2013.01); *F01D 13/02* (2013.01); *F02C 6/02* (2013.01);
(Continued)

(58) Field of Classification Search
CPC ........................................................ F01D 15/10
See application file for complete search history.

(56) References Cited

U.S. PATENT DOCUMENTS

| 7,059,136 B2 | 6/2006 | Coffinberry .................. 60/785 |
| 2003/0223892 A1 | 12/2003 | Woollenweber ............... 417/407 |

(Continued)

FOREIGN PATENT DOCUMENTS

| CN | 102883951 A | 1/2013 | ............. B64C 25/40 |
| DE | 10 2006 003 884 A1 | 8/2007 | ............. F01D 25/16 |

(Continued)

OTHER PUBLICATIONS

German Office Action, Application No. 10 2016 207 517.9, 9 pages, dated Feb. 22, 2017.

(Continued)

*Primary Examiner* — Jessica B Wong
(74) *Attorney, Agent, or Firm* — Slayden Grubert Beard PLLC

(57) ABSTRACT

Various embodiments may include a drive system for an aircraft comprising: an electrical generator; and an internal combustion engine with a gas expansion turbine. The generator includes a rotor rotating on a rotor shaft. The gas expansion turbine rotates on a turbine shaft. The rotor shaft and the turbine shaft are couplable to transmit torque such that the internal combustion engine can deliver mechanical energy to the generator. A supply air stream impinges at least one component of the generator.

10 Claims, 2 Drawing Sheets

(51) Int. Cl.
  *F02K 1/52*   (2006.01)
  *F02C 6/02*   (2006.01)
  *B64D 27/24*   (2006.01)
  *F02C 7/32*   (2006.01)

(52) U.S. Cl.
  CPC .................. *F02C 7/32* (2013.01); *F02K 1/52* (2013.01); *F05D 2220/76* (2013.01); *F05D 2250/51* (2013.01); *Y02T 50/60* (2013.01)

(56) References Cited

U.S. PATENT DOCUMENTS

| | | | |
|---|---|---|---|
| 2004/0255590 A1 | 12/2004 | Rago et al. | 60/772 |
| 2009/0115295 A1 | 5/2009 | Colin | 310/67 R |
| 2010/0143100 A1 | 6/2010 | Sharp | 415/170.1 |
| 2011/0049891 A1 | 3/2011 | Bedrine et al. | 290/46 |
| 2013/0175388 A1 | 7/2013 | Bulin et al. | 244/50 |
| 2015/0291285 A1 | 10/2015 | Gallet | 415/60 |
| 2018/0142612 A1 | 5/2018 | Immendoerfer et al. | |

FOREIGN PATENT DOCUMENTS

| | | | | |
|---|---|---|---|---|
| DE | 10 2008 014 404 A1 | 10/2009 | ............ | B64D 27/00 |
| DE | 10 2013 209 388 A1 | 11/2014 | ............ | B64D 27/00 |
| DE | 10 2014 210 451 A1 | 12/2015 | ............ | F02B 39/10 |
| EP | 1 990 519 A2 | 11/2008 | ............ | F01D 15/10 |
| EP | 2 048 329 A1 | 4/2009 | ............ | F01D 15/10 |
| FR | 2874591 A1 | 3/2006 | ............ | B64D 41/00 |
| GB | 2 409 936 A | 7/2005 | ............ | F01D 15/10 |
| WO | 2004/022948 A1 | 3/2004 | ............ | F01D 15/10 |
| WO | 2009/118298 A1 | 10/2009 | ............ | F01D 15/10 |
| WO | 2010/067172 A2 | 6/2010 | ............ | F01D 15/10 |
| WO | 2017/190940 A1 | 11/2017 | ............ | F01D 13/02 |

OTHER PUBLICATIONS

International Search Report and Written Opinion, Application No. PCT/EP2017/059134, 19 pages, dated Jun. 26, 2017.

Chinese Office Action, Application No. 201780026782.8, 6 pages, dated Jun. 1, 2020.

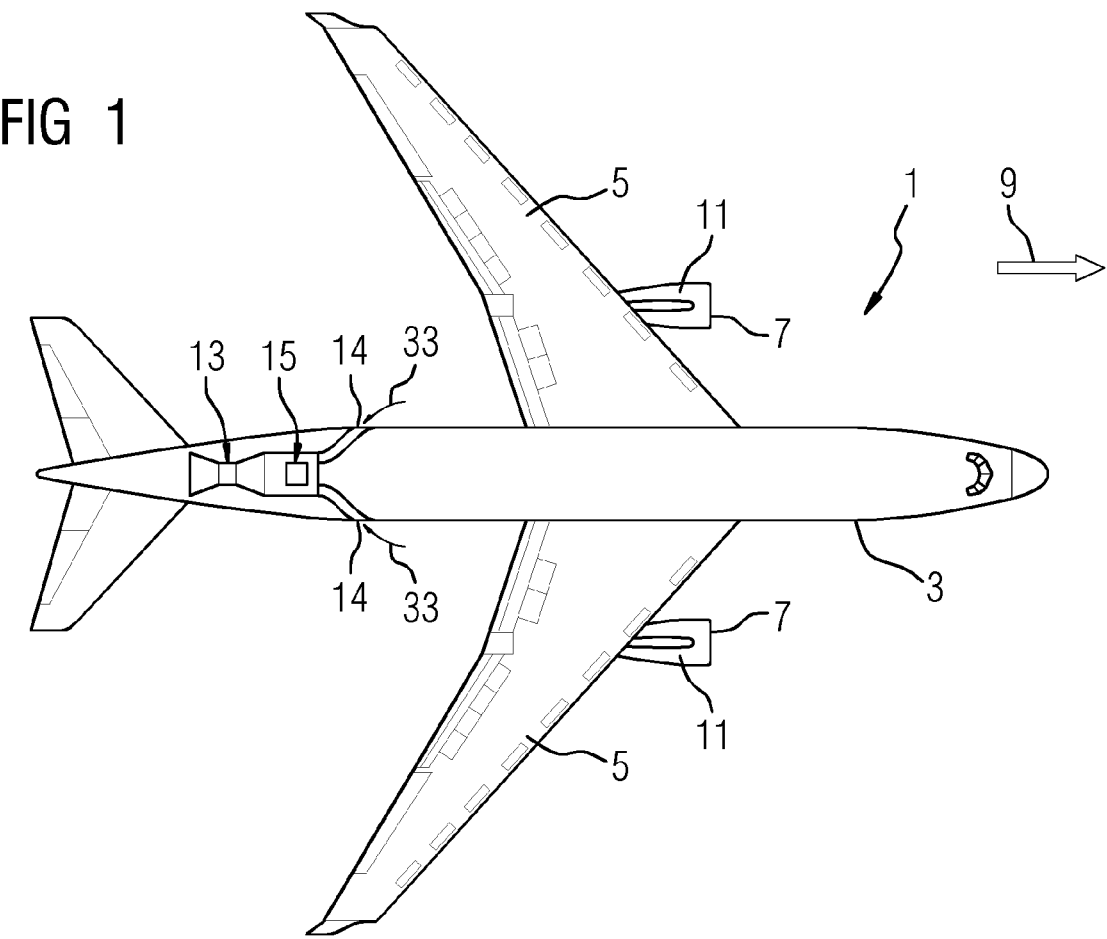
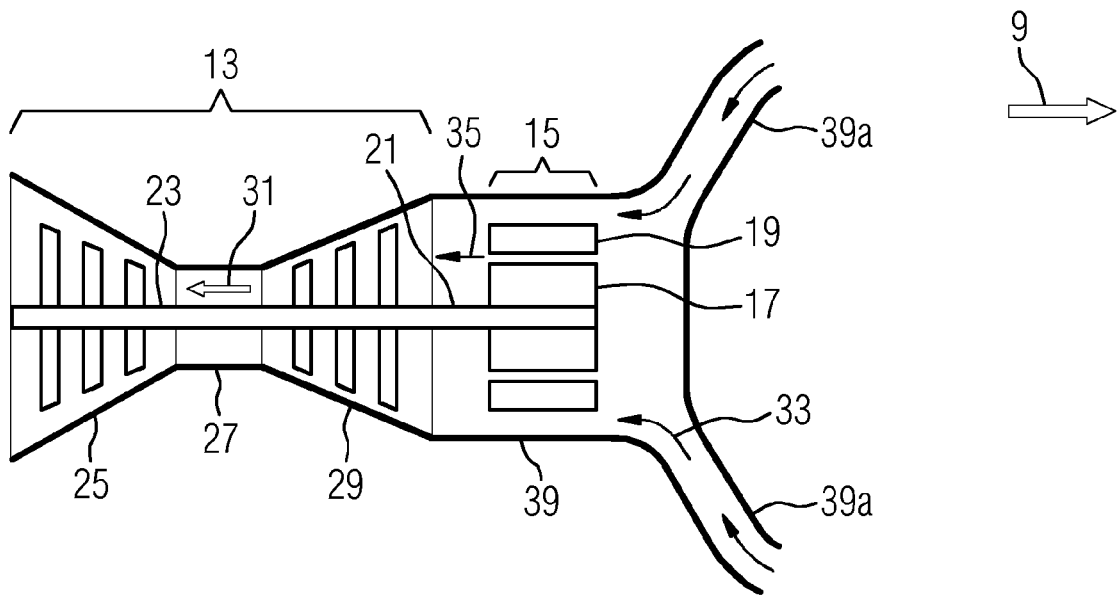

DRIVE SYSTEM FOR AN AIRCRAFT

CROSS-REFERENCE TO RELATED APPLICATIONS

This application is a U.S. National Stage Application of International Application No. PCT/EP2017/059134 filed Apr. 18, 2017, which designates the United States of America, and claims priority to DE Application No. 10 2016 207 517.9 filed May 2, 2016, the contents of which are hereby incorporated by reference in their entirety.

TECHNICAL FIELD

The present disclosure relates to aircraft. Various embodiments of the teachings herein may include a drive system for an aircraft.

BACKGROUND

Known drive systems for commercial aircraft typically have jet engines or turbofan engines, in which a fuel is burned, together with air fed from the surroundings, in an upstream combustion chamber. In the case of jet engines, the hot gas that is generated emerges as a drive jet from a nozzle and thus generates the thrust for driving the aircraft. Drive systems for aircraft with electrically driven motors are currently the subject of present development work. Such systems are already being tested as prototypes, but have not yet been realized for driving commercial aircraft. Of particular interest for future aircraft are hybrid electric drive systems, in the case of which an electric motor is fed with electrical energy which is generated on board the aircraft, with the aid of a generator, from a fuel carried on board.

In the case of aircraft presently in use, auxiliary assemblies can, in situ, generate electrical energy for an on-board electrical system and are referred to as Auxiliary Power Units. Such auxiliary assemblies typically have an internal combustion engine and a generator coupled thereto. By means of said auxiliary assemblies, it is possible for electricity for the on-board electrical system to be generated even when the jet engines of the aircraft are not running. Said auxiliary assemblies are configured for generating much lower levels of electrical power than those required for an electrical drive of the aircraft as a whole.

SUMMARY

Aircraft incorporating the teachings herein may comprise an electrical generator and an internal combustion engine with a gas expansion turbine, wherein the generator has a rotor mounted rotatably by means of a rotor shaft, wherein, furthermore, the gas expansion turbine is mounted rotatably by means of a turbine shaft, and wherein rotor shaft and turbine shaft are arranged so as to be couplable in torque-transmitting fashion such that the internal combustion engine can deliver mechanical energy for the generator.

As an example, some embodiments may include a drive system for an aircraft (1), comprising: an electrical generator (15), an internal combustion engine (13) with a gas expansion turbine (25), wherein the generator (15) has a rotor (17) mounted rotatably by means of a rotor shaft (21), wherein the gas expansion turbine (25) is mounted rotatably by means of a turbine shaft (23), wherein rotor shaft (21) and turbine shaft (23) are arranged so as to be couplable in torque-transmitting fashion such that the internal combustion engine (13) can deliver mechanical energy for the generator (15), and wherein at least one component (17, 19) of the generator (15) is arranged at least partially in or at a supply air stream (33) of the internal combustion engine (13).

In some embodiments, there is an electric motor (11) which can be supplied with electrical energy by the electrical generator (15), wherein the motor (11) is configured for driving the aircraft (1).

In some embodiments, the generator (15) is configured for a nominal power of at least 1 megawatt.

In some embodiments, the component arranged at least partially in or at the supply air stream (33) is the rotor (17) and/or a stator (19) of the electrical generator (15).

In some embodiments, the rotor (17) and/or stator (19) is arranged at least partially in or at a main path (35) of the supply air stream (31) of the internal combustion engine (13).

In some embodiments, the supply air stream (33) of the internal combustion engine (13) is divided into multiple partial paths (37), and the rotor (17) and/or stator (19) is arranged at least partially in or at one of said partial paths (35a).

In some embodiments, the partial paths (37) of the supply air stream (33) are formed as separate air channels (39) with separately controllable air streams (33).

In some embodiments, the generator (15) is cooled substantially by air.

In some embodiments, the generator (15) has a cooling device which is configured for cooling the generator (15) with a fluid coolant, wherein the cooling device has a cooling circuit (43) for the circulation of the coolant, and at least a partial region of said cooling circuit is arranged in or at a partial path (37) of the supply air stream of the internal combustion engine.

In some embodiments, the generator (15) has a heat exchanger (41) in which the coolant that is moved in the cooling circuit constitutes the first substance stream of the heat exchanger and a fraction of the supply air of the internal combustion engine constitutes the second substance stream of the heat exchanger.

In some embodiments, the cooling circuit is configured to circulate coolant in accordance with the principle of a heat pipe and/or of a thermosiphon.

As another example, an aircraft (1) may have a drive system as described above.

In some embodiments, the internal combustion engine (13) and the generator (15) are arranged in the fuselage (3) of the aircraft (1).

In some embodiments, the internal combustion engine (13) and the generator (15) are arranged in and/or on a nacelle (7), which projects from the fuselage (3) or from a wing (5), of the aircraft (1).

In some embodiments, the internal combustion engine (13) and the generator (15) are arranged in and/or on a wing (5) of the aircraft (1).

BRIEF DESCRIPTION OF THE DRAWINGS

The teachings herein will be described below on the basis of a number of exemplary embodiments and with reference to the appended drawings, in which:

FIG. 1 is a schematic illustration of an aircraft incorporating teachings of the present disclosure, FIG. 2 is a schematic illustration of parts of the drive system in the embodiment shown in FIG. 1.

DETAILED DESCRIPTION

Figure 3:
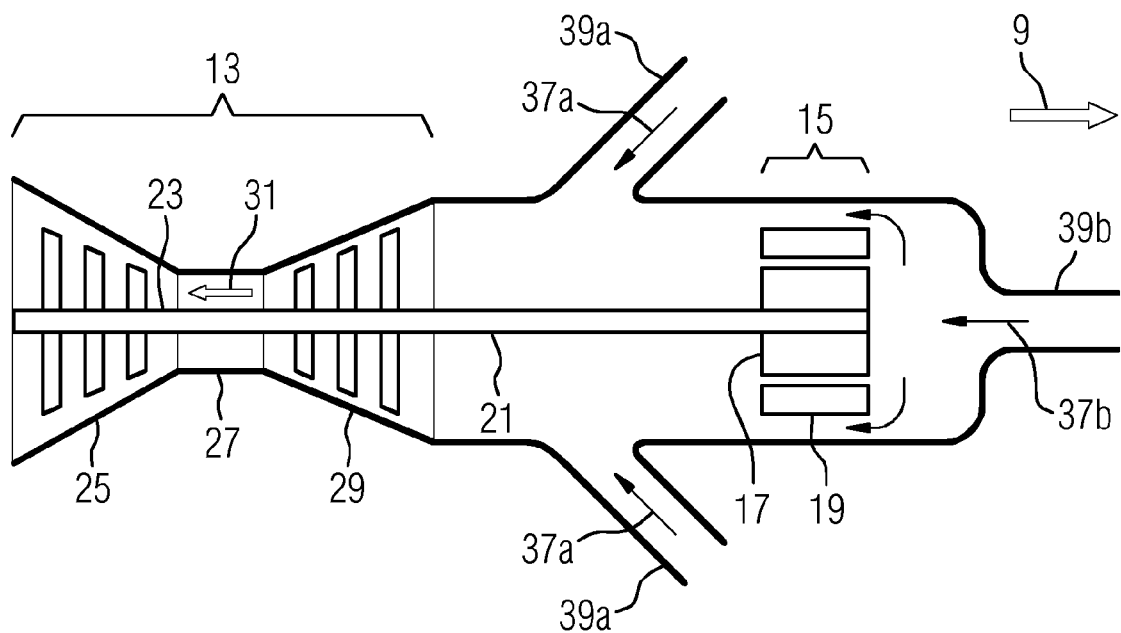
FIG. 3 is a schematic illustration of parts of a drive system according to a second embodiment incorporating teachings of the present disclosure.

In some embodiments, the main drive is configured as a hybrid electric drive. In such aircraft, the power density of the drive system is a crucial optimization factor. This means that both the power density of the electric motor and the power density of the generator used for generating electricity must be very high in order that such a hybrid electric drive is economical. Here, the mass of a cooling system provided for cooling the other generator components must also be taken into consideration in the overall mass balance.

Specifically in the case of the high levels of power required of a generator for a commercial aircraft—for example a passenger or freight aircraft—with hybrid electric drive, the outlay in terms of apparatus for the cooling of the generator is high. For such applications, consideration is being given for example to generators with power densities of greater than 20 kW/kg with a power of over 5 MW. Even with heat losses of only 1%, it is correspondingly necessary for a thermal power of approximately 100 kW to be dissipated. The use of conventional cooling devices with heat exchangers and/or fans is duly possible in principle, but their typically relatively high mass is a disadvantage for the use of the generator during electric flight. In particular, a drive system permits effective cooling of the generator used for electrical energy generation, and, at the same time, the mass of the generator, in particular of the components which have a cooling action, should as low as possible.

In some embodiments, the drive system for an aircraft has an electrical generator and has an internal combustion engine with a gas expansion turbine. Here, the generator has a rotor mounted rotatably by means of a rotor shaft, and the gas expansion turbine is mounted rotatably by means of a turbine shaft. The rotor shaft and turbine shaft are couplable in torque-transmitting fashion such that the internal combustion engine can deliver mechanical energy for the generator. At least one component of the generator is arranged at least partially in or at a supply air stream of the internal combustion engine.

The drive system is thus configured such that the internal combustion engine can generate mechanical energy by combustion of a fuel, which mechanical energy is transmitted via the coupling between turbine shaft and rotor shaft to the generator and is converted there into electrical energy. For this purpose, the internal combustion engine may comprise for example a compressor, a combustion chamber and the expansion turbine itself. The turbine shaft and the generator shaft may for example be connected to one another directly and coherently in terms of torque. They may however alternatively also be connected, or arranged so as to be connectable, to one another by means of a transmission and/or by means of a clutch.

In some embodiments, the two shafts are arranged such that mechanical energy can be transmitted from the turbine shaft to the rotor shaft. The generation of electrical energy then takes place in the generator as a result of the rotation of the rotor. Here, heat losses arise in the individual components of the generator, such that said components of the generator must be cooled during operation. The components to be cooled may in particular be the rotor of the generator and/or a stator of the generator, or alternatively also only specific parts of the rotor and/or stator which are to be cooled, such as for example windings arranged thereon.

In some embodiments, there are however also further components to be cooled, for example components of a cooling system which is used for cooling rotor and/or stator. In some embodiments, such components of the cooling system, which are possibly arranged remote from the stator and/or rotor, may be also cooled, which components may in turn be thermally coupled to the rotor and/or stator (or parts thereof).

In some embodiments, at least one such component of the generator is exposed to the supply air stream of the internal combustion engine in order to permit efficient cooling. For this purpose, at least one such component is arranged in or at said supply air stream. An arrangement "in the supply air stream" is to be understood in the present context to mean that the stated component is flowed around by the inflowing air on multiple sides. By contrast, an arrangement "at the supply air stream" is to be understood to mean that at least one surface of the respective component is exposed to the supply air stream, that is to say in other words is arranged in the flow region of the supply air stream. The arrangement "at the supply air stream" thus, by this definition, encompasses the specific arrangement "in the supply air stream".

In some embodiments, a supply air stream required for the operation of the internal combustion engine is simultaneously used for cooling the generator. In this way, the mass of the generator and of its auxiliary systems can be reduced in relation to a conventional cooling arrangement, because either a dedicated cooling device may be omitted entirely, or the generator may have a cooling device which can be configured with a lower weight in relation to an arrangement outside the supply air stream, because the cooling is assisted by the supply air stream. The utilization of the supply air stream for the internal combustion engine for the purposes of cooling the generator represents a considerable synergetic effect, with which a significant part of the mass of the generator can be omitted, because, firstly, for the operation of the internal combustion engine, a very strong supply air stream is required in any case, which can also impart a great cooling action, and secondly, a conventional generator cooling system can make up a considerable part of the mass of the generator. The generator may be configured generally without a cooling air blower, which represents a considerable mass saving.

In principle, that component of the generator which is to be cooled could also be arranged at some other location, for example at a location on the outside of the aircraft which, during flight, is impinged on by the surrounding air, wherein the air is however not introduced from there into the gas expansion turbine. Such an arrangement may be highly advantageous for the electric motor, because the motor generates heat losses in particular during flight, and a strong air stream is also available then at such an alternative location.

For the generator, such positioning is however less advantageous, because a high level of electrical power may be demanded of the generator even when the aircraft is at a standstill or moving at low speed. If the aircraft is not in flight, such locations situated on the outside are however not strongly impinged on by a flow of air. In embodiments of the present teachings, however, the high level of electrical power in the generator is also always associated with a strong supply air stream to the internal combustion engine, because the internal combustion engine indeed provides the mechanical energy for the generator. If the internal combustion engine is in operation, there will thus also always be a strong flow available in its supply air stream, which, in addition to its main function—the supply of air into the gas expansion turbine—can be utilized for the cooling of the generator. Whenever a strong flow is available, the demand for the cooling of the generator is also particularly great, because the power of the internal combustion engine increases and decreases with that of the generator, owing to the coupling of turbine shaft and rotor shaft. This is the case irrespective of the flight state of the aircraft.

In some embodiments, the supply air stream for the internal combustion engine may be generated or generatable as an intake air stream by means of an intake device. An intake element of said type may supply air flow rates of at least 20 m$^3$/s into the gas expansion turbine. The intake element may be part of the internal combustion engine; for example, the intake action may be generated by a compressor of the internal combustion engine. Such a strong air stream, as can be generated by an intake element of said type, may be jointly used for cooling the generator. By means of this use of the intake air for cooling purposes, the air is pre-warmed slightly before entering the gas expansion turbine. This warming is however relatively minor owing to the high air flow rates flowing in, and therefore has no significant influence on the efficiency of the internal combustion engine.

Through the utilization of the supply air stream of the gas turbine for the cooling of the generator, the need for additional blowers is avoided. Conventional air-type cooling arrangements of generators use heavy blowers to generate the required air flows. The mass of these blowers can be omitted by means of the arrangement described herein.

In some embodiments, the drive system may additionally comprise an electric motor which can be supplied with electrical energy by the electrical generator, wherein the motor is configured for driving the aircraft. In other words, the electrical generator is then dimensioned not merely as an auxiliary assembly, but rather the generator and motor are configured such that they—possibly in interaction with one or more further such generators and/or motors, which may likewise be part of the drive system—can drive the aircraft. The drive system may thus be configured as a main drive for the aircraft.

In some embodiments, the generator of the drive system may be configured for a nominal power of at least 1 megawatt (MW), and/or at least 10 MW. A generator configured for such levels of power is suitable for generating electricity for a main drive of a commercial aircraft, for example for passenger and/or freight transport. The internal combustion engine is then expediently configured for generating mechanical energy in at least the same stated power ranges. In the case of such dimensioning of the internal combustion engine, the required air flow rates to be drawn in are correspondingly high, such that a high air mass flow is also available for the cooling of the generator. For example, an internal combustion engine with a nominal power of 10 MW and an efficiency of 60% in the case of stoichiometric combustion requires an air stream of approximately 4.4 m$^3$/s. An excess of air gives rise to correspondingly stronger air streams, such that the total air flow rate that must be caused to flow in may lie in the range above 20 m$^3$/s, for example between 20 m$^3$/s and 30 m$^3$/s. Such an air stream permits a strong cooling action for the generator without resulting in warming of the air that is taken in, which is disruptive for the operation of the internal combustion engine.

In some embodiments, a component of the generator is arranged at least partially in or at the supply air stream. In some embodiments, this component may comprise the rotor and/or a stator of the generator. Particularly great heat losses arise in these components of the generator, such that an arrangement in the flow region of the supply air stream is particularly advantageous for these to achieve an effective dissipation of heat. In some embodiments, a superordinate arrangement of rotor and stator nested one inside the other may be arranged in the supply air stream such that the entire arrangement is flowed around by the supply air. In the case of an internal-rotor geometry of the generator, it is then primarily the outer surface of the stator that is flowed around by the supply air, whereas, in the case of an external-rotor geometry, it is primarily the outer surface of the rotor that is flowed around by the supply air. In some embodiments, the stated parts may however also be arranged so as to be merely adjacent to the flow path, wherein at least one surface of one of the stated components lies in the flow region of the supply air.

In some embodiments, the rotor and/or stator of the generator may be arranged at least partially in or at a main path of the supply air stream of the internal combustion engine. A main path of said type is, in the case of a subdivision of the supply air stream into multiple paths, to be understood to mean the path with the greatest air mass stream. Said main path may for example be a flow region which is situated outside the aircraft and in which a suction action with respect to the gas expansion turbine prevails, such that the air is drawn from said region into the gas expansion turbine. In some embodiments, said main path may however be an internal channel arranged in the aircraft, which channel is configured for conducting the supply air into the gas expansion turbine. A particularly strong air stream is generated in such an internal channel during the intake of the supply air, which air stream can be utilized for the effective cooling of the generator.

In some embodiments, the supply air stream of the internal combustion engine may be divided into multiple parallel partial paths. In some embodiments, one or more partial paths may be arranged such that the air conducted in them flows along one or more surfaces of at least one component, which is to be cooled, of the generator.

In some embodiments, the rotor and/or stator may be arranged at least partially in or at one of said partial paths. It is then possible for those surfaces of the rotor and/or stator which are to be cooled not to be exposed to the maximum air mass flow of the main path, but rather be cooled by means of a secondary path with a lower air mass stream. This may be advantageous for example to reduce mechanical flow losses as a result of the impingement of flow on the surface(s) to be cooled.

In some embodiments with multiple parallel partial paths, these may be formed as separate air channels with separately controllable air flows. For the control of the individual air flows, it is possible for valves or flaps to be arranged in the individual partial paths. Said valves or flaps may be arranged upstream and/or downstream, in the flow direction, of the one or more surfaces, which are to be cooled, of the generator. Such control of the air flows permits an adaptation of the flows to the cooling power required at the respective point in time, and to the respectively required air stream into the gas expansion turbine.

In some embodiments, the generator may be cooled substantially by air. In particular, such a primarily air-cooled generator may be configured without a cooling liquid and without an associated closed coolant circuit. By contrast to the conventional water-cooled or oil-cooled generators, a substantially air-cooled generator of said type may be configured with a relatively low weight, which is advantageous specifically in the case of use in the aviation sector. For example, the generator may then be designed without a heat exchanger and in particular without pumps. In some embodiments, effective cooling may be achieved by virtue of at least one surface to be cooled being arranged in particular in a strong region of the supply air stream.

In some embodiments, the generator may however have a cooling device configured for cooling the generator with a fluid coolant, wherein the cooling device has a cooling circuit for the circulation of the coolant, and at least a partial region of said cooling circuit is arranged in or at a partial path of the supply air stream of the internal combustion engine. In other words, the cooling mechanism is then divided into two stages: for example, the rotor and/or stator can, in a first stage, be cooled by means of the coolant, and in a second stage, the fluid coolant can in turn release the heat thus absorbed to the supply air of the gas expansion turbine. In relation to a conventional cooling system of a generator with a less expedient impingement of a flow of air, the cooling system can in this variant be of more lightweight and also more space-saving design, because the heat of the generator can be dissipated altogether more effectively to the surroundings. For example, the cooling system may be configured for a smaller volume of cooling fluid, wherein, in principle, mass both for the cooling fluid and for the surrounding material can be eliminated. To achieve this, it is for example possible for the transport path for the circulating coolant to be shortened, and/or for the cross-sectional area of the at least one coolant channel to be reduced in relation to conventional cooling devices for generators without the advantageous impingement of a flow of air. The coolant may for example be oil or water. To achieve cryogenic temperatures, for example if the rotor and/or stator are equipped with superconducting windings, use may also be made of cryogenic cooling liquids such as liquid nitrogen, liquid hydrogen, liquid neon or liquid helium. The dissipation of the heat to the surrounding air may then be realized in a multi-stage cooling process.

In some embodiments with a coolant circuit, the generator may include a heat exchanger, wherein the coolant that is moved in the cooling circuit constitutes the first substance stream of the heat exchanger and a fraction of the supply air of the internal combustion engine constitutes the second substance stream of the heat exchanger. In such embodiments, by means of the above-described second stage of the cooling device, heat can be dissipated from the coolant to the inflowing air. Owing to the strong air flow on the cold side of the heat exchanger, said heat exchanger can be designed so as to use relatively little material, and thus so as to be of lower weight, than in the case of similar cooling systems without the expedient impingement of flow in accordance with the present invention.

In some embodiments with such a cooling system, the cooling circuit may be configured to circulate coolant in accordance with the principle of a heat pipe and/or thermosiphon. In other words, the cooling circuit may have an evaporator region, in which heat is transmitted from a component, which is to be cooled, of the generator to the coolant, and the coolant changes from the liquid phase into the gaseous phase. Furthermore, the cooling circuit may have a condenser region, in which gaseous coolant changes into the liquid phase, wherein the condenser region is thermally coupled to the surface impinged on by the supply air, such that heat can be released from the condenser region to the supply air of the gas expansion turbine. If the flow of the liquid coolant in this process is assisted by gravitational force, this constitutes a thermosiphon; otherwise, it constitutes a heat pipe.

In some embodiments, the internal combustion engine and the generator may be arranged in the fuselage of an aircraft. This may be advantageous because more space is available in the fuselage of the aircraft in relation to the wings, and the flow resistance of the aircraft is not impaired by the components arranged internally here. In some embodiments, these elements may be accommodated on or close to the longitudinal axis in order to balance the aircraft, in particular if an odd number of generators is used. Furthermore, the mechanical loads on the generator during flight maneuvers are relatively low. The at least one path of the supply air stream may comprise an air channel situated internally in the fuselage of the aircraft. For example, an air inlet arranged laterally on the fuselage may serve as an inlet of a channel of said type. In some embodiments, an air inlet of said type may however also be arranged on a top side or bottom side of the fuselage.

In some embodiments, the internal combustion engine and the generator may be arranged in and/or on a nacelle, which projects from the fuselage or from a wing, of the aircraft. Such a space requirement does not come at the expense of the space provided in the interior for example for freight and passengers. Furthermore, the moving air stream available in a nacelle of said type is relatively strong. In some embodiments, the at least one path of the supply air stream to be configured for example as an air channel which runs in the nacelle. In some embodiments, the air inlet may be arranged in a front region of the nacelle in a flight direction. In the case of this embodiment in particular, it is also the case that the at least one supply air path does not need to be a closed channel, but may also be an externally situated intake region in the front region of the nacelle in the flight direction.

In some embodiments, the internal combustion engine and the generator may be arranged in and/or on a wing of the aircraft. The advantages are similar to those described above in conjunction with the arrangement in a nacelle. In some embodiments, at least one pair of such systems composed of internal combustion engine and generator is provided, which can be distributed symmetrically on the at least two wings of an aircraft. In this embodiment, too, the supply air path may be either an internally situated channel or an externally situated intake region in the front region of the respective wing.

FIG. 1 shows a schematic plan view of an aircraft 1 according to a first exemplary embodiment incorporating teachings of the present disclosure. The aircraft 1 has a fuselage 3 and two wings 5, with nacelles 7 arranged in each case on the wings 5. Within the two nacelles, there are arranged two electric motors 11 (not illustrated in any more detail here) which together effect the drive of the aircraft. It is however also possible in principle for the drive to be provided using only one electric motor, which may also be arranged at some other location on the aircraft. It is likewise also possible for more than two such nacelles to effect the drive.

The electrical current for the electric motors 11 is generated by means of a generator 15, wherein the mechanical energy for the generator 15 is delivered by an internal combustion engine 13. The internal combustion engine 13 and generator 15 are, in this example, both arranged in the fuselage 3 of the aircraft 1. The air required for the internal combustion engine 13 is in this case supplied through two inlet openings 14 in the side region of the fuselage 3. The flight direction of the aircraft is denoted here by 9, that is to say the air flows, overall, from a front region of the aircraft to a rear region of the aircraft (that is to say from right to left in the figure). The supply air stream from the outside in the fuselage is denoted here in the region of the inlet openings 14 in each case by 33.

FIG. 2 shows a schematic detailed view of parts of the drive system of the first exemplary embodiment of FIG. 1. The internal combustion engine 13 is shown, which in this case has a compressor 29, a combustion chamber 27, and a gas expansion turbine 25. By means of the compressor 29, air is drawn into the internal combustion engine 13 and compressed, and said air is subsequently burned in the combustion chamber 27 together with the fuel that is used, which is admixed to the air. The hot gas that is generated is expanded in the gas expansion turbine 25 and, here, drives the turbine shaft 23 via the turbine blades, which are merely schematically indicated. Said turbine shaft is coupled, for the transmission of mechanical energy, to the rotor shaft 21 of the generator 15, which is positioned upstream in the flow direction (that is to say is arranged in that region of the aircraft 1 which is situated further toward the front). The generator 15 comprises a rotor 17 and a stator 19, wherein the rotor 17, in the example shown, is mounted rotatably within the stator by means of the rotor shaft 21. To realize a particularly lightweight generator 15 for use in the aircraft 1, the rotor 17 and/or stator 19 may be equipped with one or more superconducting windings. It is however also possible for normally conducting windings to be used. For the function, it is merely essential that the generator is suitable for converting mechanical energy which is fed in via the rotor shaft 21 into electrical energy. The electrical energy can then be conducted via a cable (not shown in any more detail here) from the generator 15 to the motors 11 of the aircraft 1.

In the embodiment of FIG. 2, the two supply air streams 33 introduced from the inlet openings 14 of FIG. 1 meet in a central chamber, in which the two air channels 39a merge, to form a common main path 35 of the supply air. From here, the air is conducted through the compressor along the supply air stream 31 through the combustion chamber into the gas expansion turbine. In this example, the generator 15 is arranged within the main path 35 of said supply air stream, such that the generator is flowed around by the supply air. Here, in the example shown, the externally situated stator 19 is flowed around by a large amount of air and thus cooled. It is however also possible for the internally situated rotor 17 to be cooled by means of the inflowing supply air. By contrast to conventional drive systems, the generator is arranged upstream of the gas expansion turbine in the air flow direction.

FIG. 3 shows a schematic detail view of parts of the drive system according to a second exemplary embodiment incorporating teachings of the present disclosure. Said parts of the drive system may, be integrated into the fuselage 3 of the aircraft.

An internal combustion engine 13 and a generator 15 are again shown, wherein the individual components thereof are arranged similarly to those in the embodiment of FIG. 1 and are denoted by the same reference designations. By contrast to the first embodiment, however, the supply air stream is also divided, a short distance upstream of the compressor 29, into multiple partial paths 37a and 37b, wherein the generator 15 is arranged only in the central partial path 39b, that is to say in a region positioned upstream of a merging of the individual partial paths before they are jointly fed into the compressor 29. Thus, in this example, the generator 15 is also flowed around by parts of the supply air. However, said generator is not exposed to the full air stream, but only to the partial stream in the central air channel 39b. The outer air channels 39a may however transport a large fraction of the overall air stream, wherein the different fractions may be controllable in particular by means of valves and/or flaps which are not shown here. Accordingly, the air stream in the partial channel 39b can be set in targeted fashion and adapted to the cooling power required by the generator 15. In particular, the air streams in the individual partial channels 39a and 39b may be adapted to the respective power of the generator 15.

Figure 4:
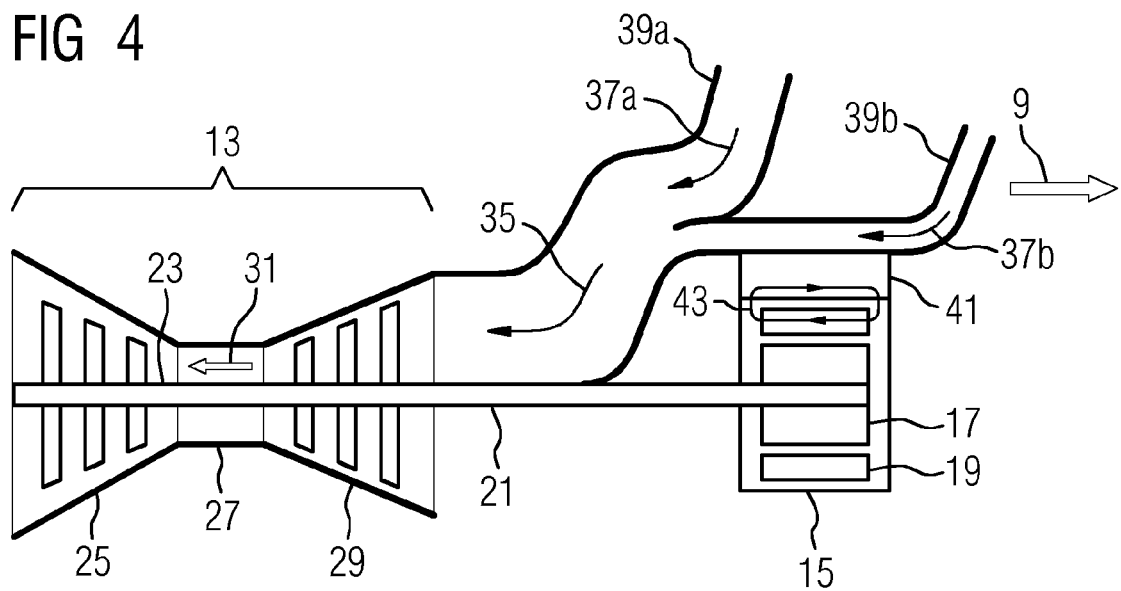
FIG. 4 is a schematic illustration of parts of a drive system according to a third embodiment incorporating teachings of the present disclosure.

FIG. 4 shows a schematic detail view of parts of the drive system according to a third embodiment incorporating teachings of the present disclosure. Said parts of the drive system may, similarly to the situation shown in FIG. 1, be integrated into the fuselage 3 of the aircraft. In some embodiments, the internal combustion engine 13 and the generator 15 may be arranged in other regions of the aircraft 1, for example in the region of the wings or on or in a nacelle on the fuselage or on a wing. Here, it is also possible for multiple such internal combustion engines and generators to be used if appropriate. The various arrangements of the combination of internal combustion engine and generator in different regions of the aircraft may be combined with the various configurations of the type of impingement of flow on the constituent parts of the generator.

By contrast to the two above exemplary embodiments, it is the case in the example of FIG. 4 that the rotor 19 and stator 17 of the generator 15 are not arranged directly in the flow region of the supply air stream, but rather the generator has a coolant circuit 43 and a heat exchanger 41, wherein the heat exchanger is designed to effect a heat transfer from the coolant circulating in the coolant circuit 43 to the inflowing air in the partial path 37b. For this purpose, at least one surface of the heat exchanger 41 is arranged in a flow region of the partial path 37b of the supply air.

The coolant circuit 43 is in this case merely schematically indicated by an arrow closed in ring-shaped fashion. Said arrow leads in this case through the stator 19, which indicates a circulation of the coolant through said component. In some embodiments, such a—liquid or gaseous—coolant may however also circulate through the rotor and cool the latter. For this purpose, it is for example possible for fluid coolant to be conducted in and also conducted out again at that shaft end of the rotor shaft 21 which is shown on the right in FIG. 4. Irrespective of the exact embodiment of the coolant circuit 43, the essential function is that of cooling, by means of the fluid coolant, the components that are warmed during the operation of the generator 15, and, by means of the heat exchanger 41, releasing the heat thus dissipated to the air flowing past in the air channel 39b.

In the example of FIG. 4, the supply air is in turn divided into two partial channels 39a and 39b, wherein, for example, there may also be yet further partial channels (not illustrated here) in the lower part of the figure. In principle, it is however possible for the indirect cooling of the generator 15 by means of the heat exchanger to also be realized in a non-branched main channel of the supply air, or in a region of the channel into which multiple partial channels have already issued to form a main channel, similarly to the situation shown for the direct cooling in FIG. 2. In the example shown in FIG. 4 with multiple partial channels 39a and 39b and multiple partial paths 37a and 37b of the supply air, it is in turn expediently possible for the fraction of the supply air in the individual partial channels to be metered such that the cooling action is adapted to the amount of heat to be dissipated, and at the same time the flow losses can advantageously be kept low.

What is claimed is:

1. A drive system for an aircraft, the system comprising:
an electrical generator; and
an internal combustion engine with a gas expansion turbine;
wherein the generator includes a rotor rotating on a rotor shaft;
the gas expansion turbine rotates on a turbine shaft;
the rotor shaft and the turbine shaft are coupled to transmit torque such that the internal combustion engine can deliver mechanical energy to the generator; and
a supply air stream impinges at least one component of the generator.

2. The drive system as claimed in claim 1, further comprising an electric motor supplied with electrical energy by the electrical generator, wherein the electric motor drives the aircraft.

3. The drive system as claimed in claim 1, wherein the generator supplies a nominal power of at least 1 megawatt.

4. The drive system as claimed in claim 1, wherein the at least one component comprises the rotor or a stator of the electrical generator.

5. The drive system as claimed in claim 1, wherein the supply air stream comprises multiple partial paths and the at least one component is arranged at least partially within one of the partial paths.

6. The drive system as claimed in claim 5, wherein the multiple partial paths of the supply air stream comprise separate air channels with separately controllable air streams.

7. The drive system as claimed in claim 1, wherein the generator is cooled by air.

8. The drive system as claimed in claim 1, wherein:
the generator comprises a cooling device for cooling the generator with a fluid coolant;
the cooling device includes a cooling circuit for circulating the coolant; and
at least a partial region of said cooling circuit is arranged within a partial path of the supply air stream of the internal combustion engine.

9. The drive system as claimed in claim 8, wherein the generator comprises a heat exchanger employing the coolant as a first substance stream and at least part of the supply air of the internal combustion engine as a second substance stream.

10. The drive system as claimed in claim 8, wherein the cooling circuit circulates coolant in accordance with the principle of a heat pipe and/or of a thermosiphon.

* * * * *